No. 783,095. PATENTED FEB. 21, 1905.
C. R. BOHANNON.
VEHICLE WHEEL.
APPLICATION FILED AUG. 31, 1904.
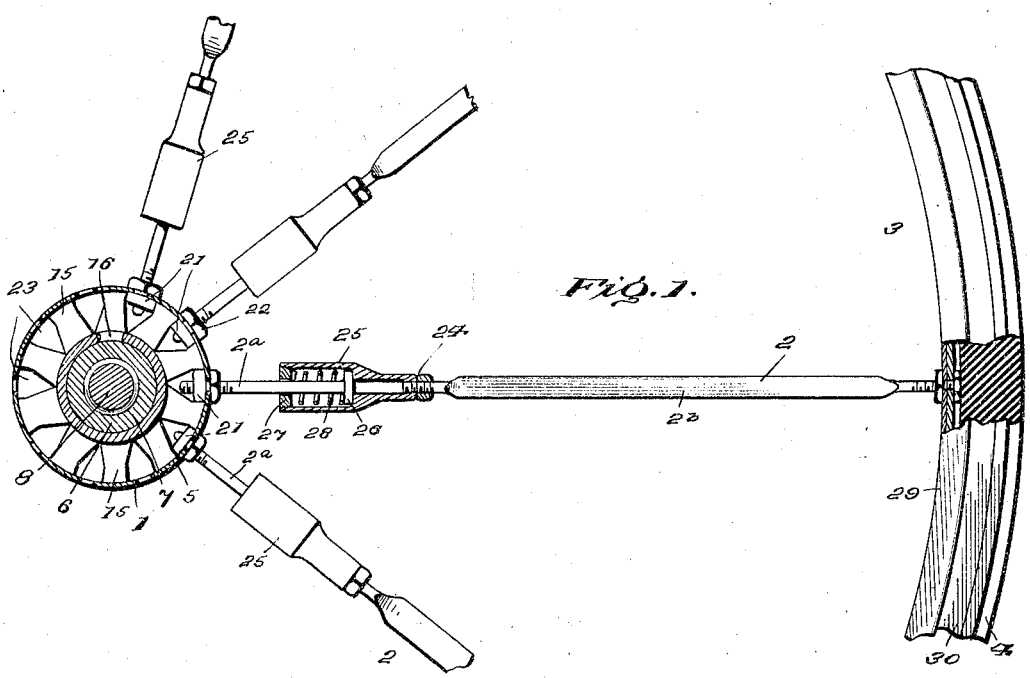
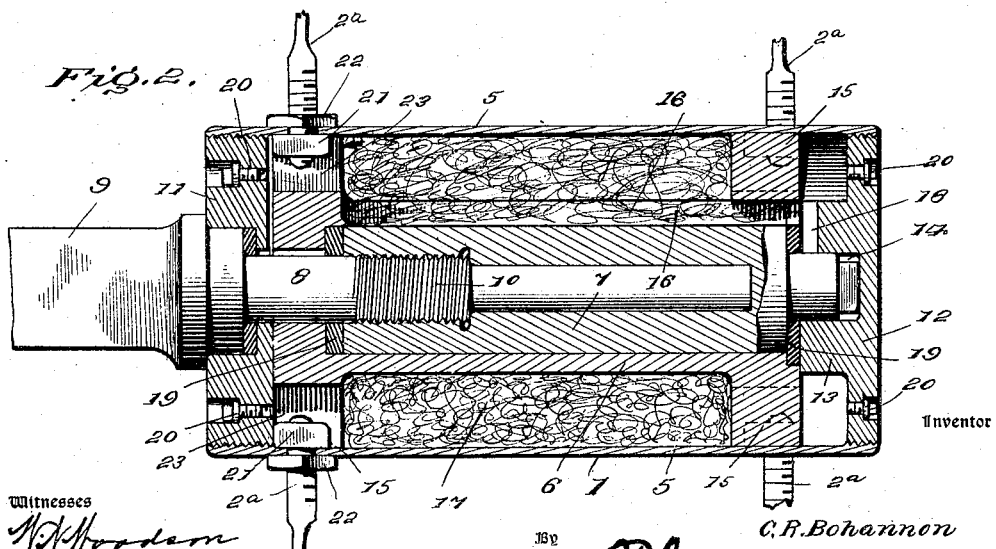

No. 783,095. Patented February 21, 1905.

UNITED STATES PATENT OFFICE.

CHARLEY R. BOHANNON, OF WELSH, LOUISIANA.

VEHICLE-WHEEL.

SPECIFICATION forming part of Letters Patent No. 783,095, dated February 21, 1905.

Application filed August 31, 1904. Serial No. 222,859.

*To all whom it may concern:*

Be it known that I, CHARLEY R. BOHANNON, a citizen of the United States, residing at Welsh, in the parish of Calcasieu and State of Louisiana, have invented certain new and useful Improvements in Vehicle-Wheels, of which the following is a specification.

This invention embodies a novel construction of wheel, and is particularly adapted for automobiles or like vehicles, but designed to be applied in any capacity wherein the ordinary type of vehicle-wheel is usually employed.

The invention relates primarily to the general wheel structure, the spokes being peculiarly constructed and mounted in connection with a special construction of hub and rim elements.

For a full description of the invention and the merits thereof and also to acquire a knowledge of the details of construction of the means for effecting the result, reference is to be had to the following description and accompanying drawings.

While the essential and characteristic features of the invention are susceptible of modification, still the preferred embodiment of the invention is illustrated in the accompanying drawings, in which—

Figure 1 is a broken view showing the construction of the wheel embodying my invention, the hub and rim sections, as well as one of the spokes, being shown in section. Fig. 2 is a vertical sectional view showing the hub of the wheel more clearly, the same being mounted upon a vehicle-spindle, the latter being shown broken away.

Corresponding and like parts are referred to in the following description and indicated in both the views of the drawings by the same reference characters.

Generally describing the invention, the wheel comprises, essentially, the hub 1, the spokes 2, and the rim 3, having the tire 4 mounted thereon. The hub 1 consists of an outer shell 5 and the axle-box 6. The axle-box 6 is mounted within the shell 5 and receives in the construction illustrated the axle-skein 7 of the spindle-arm 8 of the axle 9. The skein 7 of the axle-arm is suitably mounted thereon, being threaded thereto, as shown at 10. An inner cap 11 and an outer cap 12 close the respective inner and outer ends of the shell 5, the outer cap 12 having projected from the inner side thereof a central boss 13, which boss is provided centrally with a recess 14, forming a bearing, within which the outer end of the skein 7 is received. The caps 11 and 12 of the shell 5 are preferably threaded into the ends of the shell and by closing the said ends prevent entrance of dust or other foreign matter which might be detrimental to the proper working of the invention. The inner cap 11 is provided with an opening through which the axle-arm 8 passes, as shown most clearly in Fig. 2 of the drawings. At the ends of the axle-box 6 are disposed a plurality of radially-projecting lugs 15, which lugs extend into contact with the inner peripheral portion of the shell 5, fitting snugly therein to promote the rigidity of the hub structure. The lugs 15 coöperate with the spokes 2 in a manner which will be described more clearly hereinafter. In order that the hub may be effectively lubricated, the axle-box 6 is provided longitudinally thereof with an open slot 16, through which the lubricant may pass to the skein 7. The lubricant may consist of oil or the like, and in order to retain the oil waste or similar material (indicated at 17) is disposed in the space forméd between the body of the axle-box and the shell 5. The waste holds the lubricant in suspension, allowing same, however, to thoroughly lubricate the hub during the revolution of the wheel. The slot 16 extends to the outer end of the axle-box, and the peripheral portion of the boss 13 of the outer cap 12 is provided with a groove 18, which permits the lubricant to pass into the recess 14. Suitable washers 19 are interposed between the outer and inner ends of the axle-box 6 and adjacent portions. Oil-holes 20 are provided in the caps 11 and 12, as shown in Fig. 3.

The spokes 2, which are of a special form, are preferably made in sections, (designated as $2^a$ and $2^b$, respectively.) The sections $2^a$ and $2^b$ are inner and outer sections, respectively, and the inner section $2^a$ of each spoke is threaded at its innermost end and passes through an opening in the shell 5 of the hub. A nut 21 screws upon the inner end of the spoke-section $2^a$ within the shell, and this nut secures the inner end of the spoke to the hub. A jam-nut 22 screws upon a threaded end of the section $2^a$, but upon the outer side of the shell 5. The two nuts 21 and 22 receive the shell therebetween and clamp hard against opposite sides thereof. The lugs 15 of the axle-box are provided upon opposite sides with recesses 23, which receive the innermost nut at the inner end of each spoke 2. The recesses 23 thus form seats for the nuts 21 and reinforce the spokes and the connection thereof with the hub. Further, the nuts 21 are prevented from rattling or likelihood of displacement. The outer section $2^b$ of each spoke 2 is preferably made of flat metal, such as steel or the like, in order to have a certain degree of flexibility, and the inner end of the section $2^b$ is attached, by means of a threaded connection, (shown at 24,) with a casing 25. The casing 25 receives the outer end of the inner section $2^a$ of the spoke, which outer end is provided with an annular enlargment 26. The inner end of the casing 25 is closed by means of a plug or cap 27, and between this cap 27 and the annular enlargement 26 is interposed a spring 28. The spring 28 is designed to take up any jar or vibration incident to the travel of the wheel over rough ground or striking obstructions of any kind. It will be noted from the foregoing that the wheel is thus provided with cushion means by which vibration is reduced and an elastic flexible structure constituted.

Having thus described the invention, what is claimed as new is—

1. In wheel structure, in combination, a hub comprising a shell, an axle-box within said shell, lugs projected radially from the axle-box, means for preventing displacement of the axle-box from the shell, a rim, spokes attached to the rim at their outer ends and having their inner ends received by the shell of the hub, and nuts securing the inner ends of the spokes to the shell and coöperating with the lugs of the axle-box.

2. In a wheel structure, in combination a hub comprising a shell, an axle-box within said shell and having a plurality of recessed portions adjacent the ends thereof, means for preventing displacement of the axle-box from the shell, spokes extended from the hub and having their inner ends passed through the shell, and nuts threaded upon the inner ends of the spokes and received by the recessed portions of the axle-box to coöperate therewith as specified.

3. In a wheel, in combination, a hub comprising an outer shell, an axle-box within said shell and provided with radially-extending lugs at its ends, said lugs forming a lubricant-space in the shell and the axle-box, the axle-box being provided longitudinally thereof with an open slot, caps closing the ends of the shell, spokes extended from the hub and having their inner ends passed through the shell, and nuts threaded upon the inner ends of the spokes within the shell and disposed between adjacent lugs of the axle-box to coöperate therewith as specified.

In testimony whereof I affix my signature in presence of two witnesses.

CHARLEY R. BOHANNON. [L. S.]

Witnesses:
F. W. JOPLIN.
W. M. TERRY.